United States Patent [19]

Cuthbert

[11] Patent Number: 4,840,072
[45] Date of Patent: Jun. 20, 1989

[54] VARIABLE ORIFICE FLOW METER

[76] Inventor: Roy M. Cuthbert, c/o Webtec Products, Ltd., Edison Road, St. Ives, Cambridgeshire, PE17 4LZ, England

[21] Appl. No.: 81,823

[22] Filed: Aug. 5, 1987

[30] Foreign Application Priority Data

Oct. 28, 1986 [GB] United Kingdom ............... 8625705

[51] Int. Cl.$^4$ .............................................. G01F 1/26
[52] U.S. Cl. .................................................. 73/861.58
[58] Field of Search ............ 73/861.53, 861.54, 861.58

[56] References Cited

U.S. PATENT DOCUMENTS

| | | |
|---|---|---|
| 2,574,866 | 11/1951 | Fahrlander ...................... 73/861.58 |
| 2,647,402 | 8/1953 | Ibbott .............................. 73/861.58 |
| 2,816,441 | 12/1957 | Ezeriel ............................ 73/861.58 |
| 4,254,664 | 3/1981 | Graham . |
| 4,304,136 | 12/1981 | McCabe ......................... 73/861.54 |
| 4,366,718 | 1/1983 | Nelson ............................ 73/861.58 |
| 4,552,027 | 11/1985 | Larner ............................ 73/861.53 |

FOREIGN PATENT DOCUMENTS 0078870 5/1983 European Pat. Off. .
0171931 2/1986 European Pat. Off. .
1252918 10/1967 Fed. Rep. of Germany .
2521952 12/1975 Fed. Rep. of Germany .

Primary Examiner—Herbert Goldstein
Attorney, Agent, or Firm—Banner, Birch, McKie & Beckett

[57] ABSTRACT

A variable orifice liquid flow meter comprises a body, a bore in the boby defining a flow tube for liquid, a sharp edged orifice in the bore, a piston having a head capable of blocking the orifice and a stem by which the piston is supported for axial movement relative to the orifice, resilient member urging the piston head into a position to block the orifice, support for the piston mounted in the bore, a plurality of fins on the support and extending radially thereof to fix the support to the wall of the flow tube, the support having a generally cylindrical portion formed with a blind bore in which the stem of the piston is slidably mounted and which shields at least a portion of the piston from liquid flow through the bore, the end of the support adjacent to the blind end of the bore being streamlined, a passage in the support permitting communication by liquid in the flow tube with the portion of the piston in the blind bore, and resilient member in the support arranged to urge the piston to block the orifice.

9 Claims, 3 Drawing Sheets

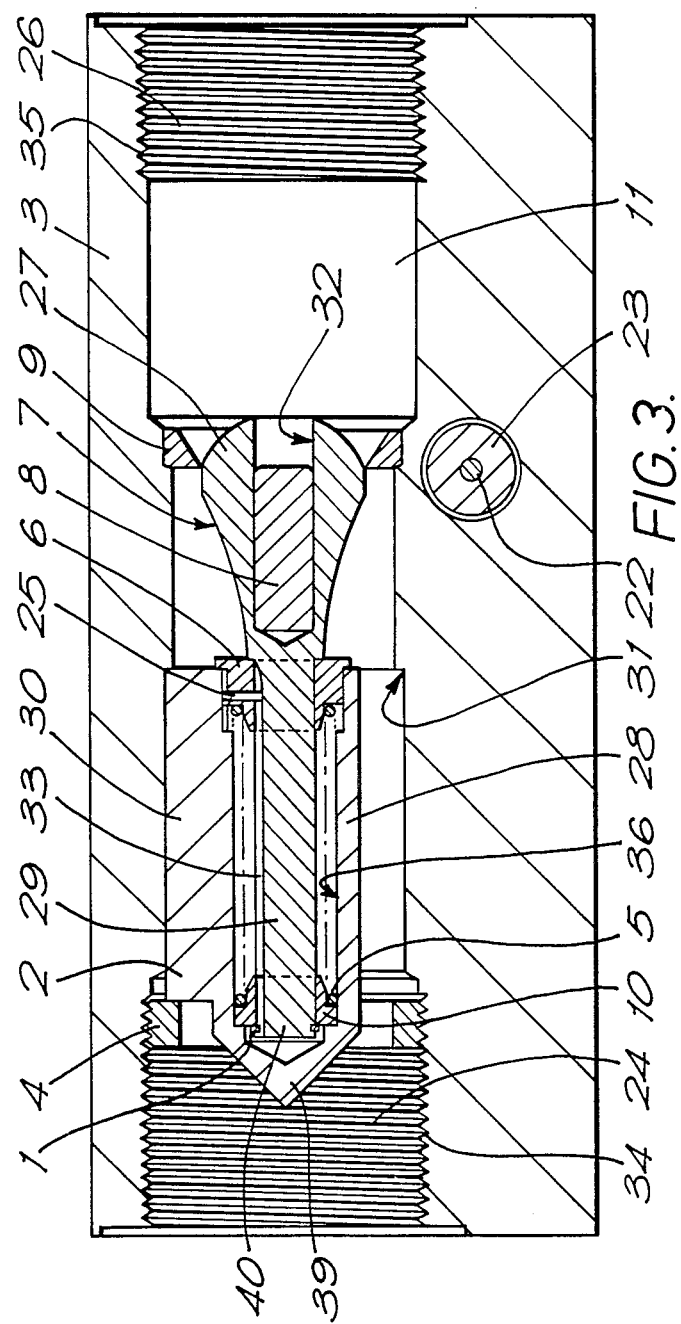

VARIABLE ORIFICE FLOW METER

The invention relates to a variable orifice flow meter.

Variable orifice flow meters are intended as simple and low-cost devices for measuring liquid flow. They comprise an orifice which is blocked by a piston held in position by a spring, or in the case of some vertical designs, by gravity. Liquid flow through the meter displaces the piston against the spring, opening up the orifice, the extent of displacement of the piston being directly proportional to the liquid flow rate. In some designs, a flow tube in which the piston is disposed is tapered and in others the piston is tapered or suitably contoured. With many low-pressure meters, the piston is contained in a glass tube so that the displacement of the piston can be seen through the glass. A suitable scale can be calibrated in the required units and fixed adjacent to the glass tube so that the piston displacement can be measured directly. With meters intended for higher pressures, glass is not suitable and the use of metal or other opaque substances requires a different method of determining the piston displacement. A method commonly used is to fix a magnet to the piston with a follower external to the flow tube suitably responsive to movement of the magnet and calibrated to show the flow. This follower can be of a magnetic material such as steel, or alternatively may itself be a linear or rotary magnet to which an indicating pointer is fixed.

It is obviously necessary that the piston is concentric with the orifice and is free to slide so that it can be easily moved by the liquid flow against the resistance provided by the spring. The piston is normally held centrally of the flow tube either by a central guide bar or by means of fins on the piston which are a good fit against the sides of the flow tube but with a small diametral clearance to allow it to slide freely. Displacement of the piston is primarily effected by the pressure drop across the orifice and to a lesser extent, below the critical Reynolds Number, by viscous drag on the surface area of the piston. Although a sharp edge orifice is inherently free of viscosity effects, the viscous drag (which varies with the viscosity of the liquid) will effect the piston displacement. In addition, at higher flow rates above the upper critical Reynolds number, where flow is turbulent, the pressure drop along the length of the piston acts on the cross-sectional area of the piston and provides an additional force tending to displace the piston. Under turbulent conditions this pressure drop increases with the roughness of the surface finish of the piston and the tube that is in contact with the flow.

A substantial change in viscosity takes place with a relatively small change of temperature in most mineral oils, and can give rise to large reading errors. The change in viscosity affects the drag and also changes the flow rate at which the liquid changes from laminar to turbulent flow. For this reason, known flow meters of the kind described above are usually calibrated for a liquid of a given viscosity and at a specified density and temperature.

An object of the invention is to improve the accuracy of a variable orifice flow meter used for measuring the flow of liquids by making it less sensitive to changes in the viscosity of the liquid.

According to the invention there is provided a variable orifice liquid flow meter comprising a body, a bore in the body defining a flow tube for liquid, a sharp edged orifice in the bore, a piston having a head capable of blocking the orifice and a stem by which the piston is supported for axial movement relative to the orifice, resilient means urging the piston head into a position to block the orifice, and support means in which the stem of the piston is axially slidably housed and shielded from liquid flow through the bore.

From another aspect the invention is a variable orifice flow meter comprising a body, a bore in the body defining a flow tube for liquid, a sharp edged orifice in the bore, a piston having a head capable of blocking the orifice, support means for the piston mounted in the bore, the support means having a blind bore in which the piston is slidably mounted, and resilient means in the support means and arranged to urge the piston to block the orifice. Preferably the end of the support means adjacent to the blind end of the bore is streamlined.

Advantageously a passage is provided in the support means to permit communication by liquid in the flow tube with the portion of the piston in the blind bore. The support means may be fixed to the wall of the flow tube by means of fins extending radially from a generally cylindrical portion housing the blind bore.

Preferably the end of the piston remote from its head is formed with a follower which is slidable in the blind bore, and preferably a gland mounted in the blind bore adjacent to its open end is arranged slidingly to support the piston. Means is preferably provided for preventing axial rotation of the piston in the blind bore. A magnet may be fixed in the piston and arranged to drive a piston displacement indicator.

The invention is diagrammatically illustrated, by way of example, in the accompanying drawings, in which:

FIG. 3 is a cross-sectional side elevation on the line B—B of FIG. 2; and

Figure 1:
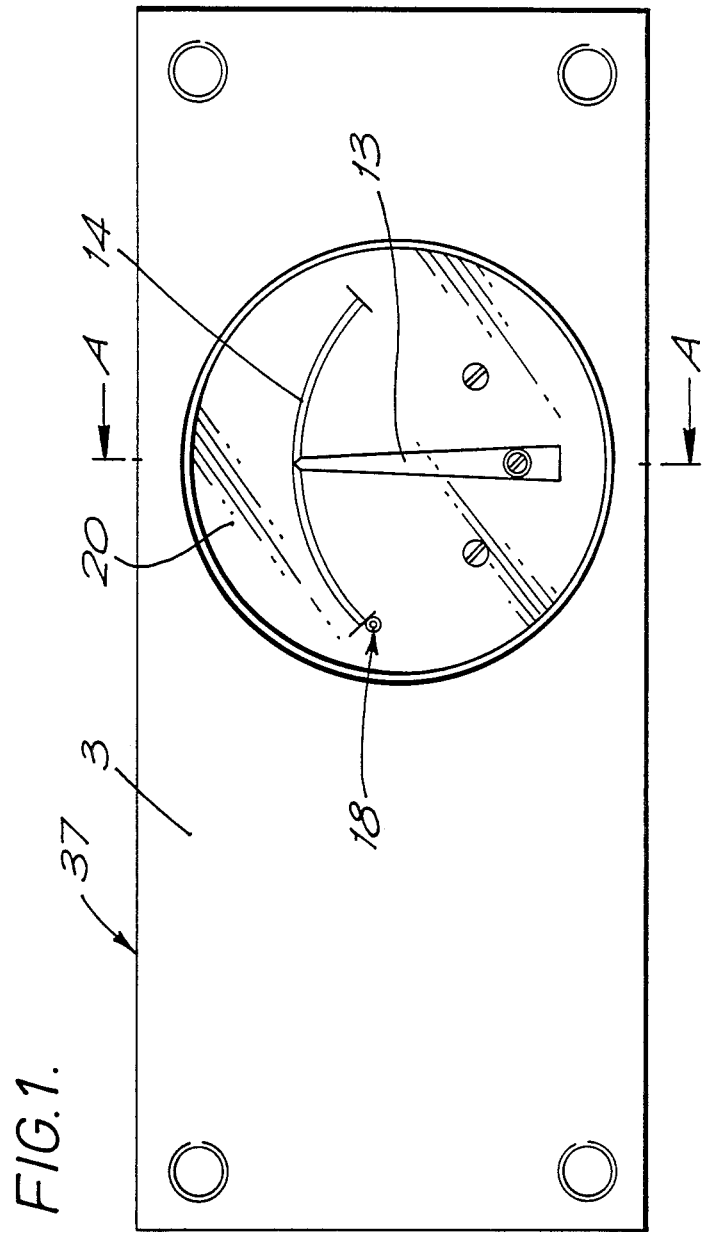
FIG. 1 is a side view of a variable orifice liquid flow meter.
Figure 2:
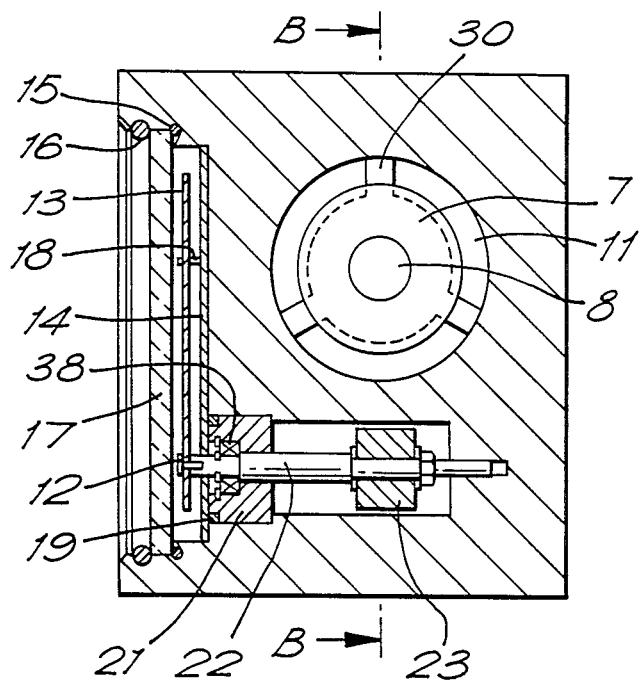
FIG. 2 is a cross-sectional end elevation on the line A—A of FIG. 1.

In the drawings there is shown a variable orifice flow meter 37 comprising a body 3 formed as a generally rectangular solid metal block having a bore 11 extending from an inlet 24 in one end face of the body 3 to an outlet 26 in the opposite end face of the body. The bore 11 defines a flow tube for liquid to be metered through the body 3.

A sharp-edged orifice ring 9 is stationarily mounted in the bore 11 of the meter 3 and is thus positioned in the flow path of the liquid. For zero flow conditions, the orifice ring is completely blocked by the head 27 of a piston 7 disposed in the bore. The piston 7 is formed with a stem 29 which is axially slidably mounted centrally in the bore 11 in the blind bore 36 of a support cylinder 2. The support cylinder 2 comprises a central cylindrical hub 28 surrounding the stem 29 of the piston and three radial blades or fins 30 which engage the wall of the bore 11 to position the support cylinder in the bore. The end 39 of the hub 28 adjacent to the blind end of the bore 36 is streamlined. The support cylinder is held against axial movement in the bore against a shoulder 31 formed in the bore by means of a ring 4 threaded into the wall of the bore.

Figure 4:
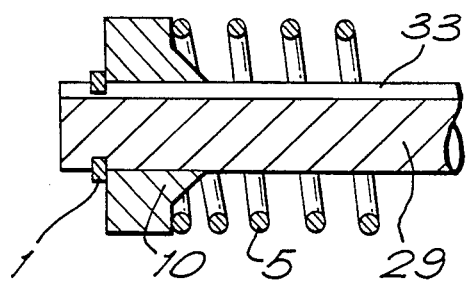
FIG. 4 is a scrap view of a detail of the device shown in FIG. 3.

The stem 29 of the piston 7, which is formed with an axial bore 32 containing a longitudinal magnet 8, is held central in the support cylinder 2 by a gland 6 fixed, e.g. by a screw-thread, in the support cylinder and snugly surrounding the piston stem and by a piston follower 10 secured to the free end 40 of the piston stem and slidable in the cylinder 2. As shown in FIG. 4 the follower 10 is secured to the piston stem 29 by means of a circlip 1. It will be understood however that the follower could be fixed in other ways.

The piston is constantly urged into the support cylinder 2 by means of a spring 5 surrounding the piston stem 29 and engaging the follower 10 and the gland 6 respectively. The free length of the spring 5 is so arranged that when contained in the support cylinder 2 it exerts a pre-load on the piston 7 in excess of the piston's weight, thus enabling the meter to be used in both the vertical and horizontal positions. The piston is prevented from rotating in the cylinder 2 by a pin 25 mounted in the gland 6 and which engages in a longitudinal slot 33 cut in the piston stem 29. This slot 33 also permits liquid communication between the flow tube and the blind bore and ensures that the liquid pressure acting on the piston stem is the same as the pressure on the piston immediately down stream of the support cylinder.

Liquid flow through the device pushes the piston head, which is arranged to have a smooth surface finish, through the orifice ring and opens an annular gap through which liquid can pass. If the flow rate increases, the piston is forced further through the orifice ring thus allowing a larger area through which the liquid can flow. By arranging a suitable contour for the piston head, the displacement of the piston can be made approximately linear with the increased flow rate.

A cylindrical magnet 23 which is magnetised across its diameter is fixedly mounted on a shaft 22 which is supported at one end by a plain bearing in the body of the meter, the other end of the shaft 22 being supported by a deep-grooved ball bearing 38 mounted in a carrier 21 mounted in the body and which allows free rotary motion of the shaft 22 while providing axial support. The cylindrical magnet 23 is so positioned that movement of the longitudinal magnet 8 induces it to rotate. The two magnets can be considered as a rack and pinion device connected together by their magnetic fields rather than gear teeth. For this reason, the longitudinal magnet 8 cannot be allowed to rotate about its own axis since with many commerical magnets the magnetic field is not evenly distributed and rotation could give a similar effect to displacement. Connected to the end of the shaft 22 by means of a screw 12 is the pointer 13 of a dial gauge generally indicated at 20. The dial gauge 20 comprises a scale 14. The pointer is shown at the mid-scale position for the sake of clarity in FIG. 1, but with the orifice ring blocked by the piston, i.e. zero flow conditions, the pointer would be resting against a stop 18 at the extreme left of the scale. The scale is calibrated in suitable flow units and any non-linearity of the meter can be compensated for by a corresponding non-linear scale. A window 17, which in this case is made from clear polycarbonate, is used to protect the scale and pointer. The window is held in position by a snap ring 16. O-rings 15 and 19 are fitted to the scale and pointer assembly of the dial gauge, to absorb shock, to allow for some variation in tolerances of the parts and to prevent the ingress of dirt and other contamination.

The bore 11 in body 3 has threaded ports 34, 35 at its inlet 24 and outlet 26 respectively into which suitable adaptors may be screwed for connecting the device to a pipeline. Apart from the magnets, the flow meter is preferably mainly constructed from non-magnetic materials.

Thus the variable orifice flow meter shown in the drawings is substantially free of viscosity effects on its accuracy, this being achieved by reducing and shielding a large part of the surface area of the piston from the liquid flow, minimising the length of the piston in contact with the liquid flow, balancing out the pressure differential along most of the piston length and ensuring a smooth finish where it is in contact with the liquid flow.

This invention is not restricted to the particular design shown in the drawings. Thus the support cylinder could be placed down stream of the orifice ring; alternatively, two support cylinders could be used, one upstream and the other downstream of the orifice ring. The meter could also be modified to measure bi-directional flow by having a double-headed piston and by positioning the piston follower 10 half way along the piston steam with a spring on either side.

I claim:

1. A variable orifice flow meter comprising a body, an inlet in the body, an outlet in the body, a bore in the body extending between the inlet and the outlet and defining a straight flow passage for liquid, a sharp edged orifice in the bore, a piston having a head capable of blocking the orifice, support means for the piston mounted in the bore, the support means having a blind bore in which the piston is slidably mounted and resilient means in the support means and arranged to urge the piston to block the orifice.

2. A variable orifice flow meter according to claim 1, wherein the upstream end of the support means is streamlined.

3. A variable orifice flow meter according to claim 1, comprising a passage in the support means permitting communication by liquid in the flow passage with the portion of the piston in the blind bore.

4. A variable orifice flow meter according to claim 1, wherein the support means comprises a generally cylindrical portion housing the blind bore, and wherein the support means is fixed to the wall of the flow passage by means of fins extending radially from the generally cylindrical portion.

5. A variable orifice flow meter according to claim 1, wherein the end of the piston remote from its head is formed with a follower which is slidable in the blind bore.

6. A variable orifice flow meter according to claim 5, wherein a gland mounted in the blind bore adjacent to its open end is arranged slidingly to support the piston.

7. A variable orifice flow meter according to claim 1, comprising means for preventing axial rotation of the piston in the blind bore.

8. A variable orifice flow meter according to claim 1, comprising a magnet fixed in the piston and arranged to drive a piston displacement indicator.

9. A variable orifice liquid flow meter comprising a body, an inlet in the body, an outlet in the body, a bore in the body extending between the inlet and the outlet and defining a straight flow passage for liquid, a sharp edged orifice in the bore, a piston having a head capable of blocking the orifice and a stem by which the piston is supported for axial movement relative to the orifice, resilient means urging the piston head into a position to block the orifice, support means for the piston mounted in the bore, a plurality of fins on the support means and extending radially thereof to fix the support means against movement in the flow passage, the support means having a generally cylindrical portion formed with a blind bore in which the stem of the piston is slidably mounted and which shields at least a portion of the piston from liquid flow through the bore, the upstream end of the support means being streamlined, a passage in the support means permitting communication by liquid in the flow tube with the portion of the piston in the blind bore, and resilient means in the support means arranged to urge the piston in a direction to block the orifice.

* * * * *